US009703957B2

(12) United States Patent
Sallam (10) Patent No.: US 9,703,957 B2
(45) Date of Patent: *Jul. 11, 2017

(54) ATOMIC DETECTION AND REPAIR OF KERNEL MEMORY

(71) Applicant: McAfee, Inc., Santa Clara, CA (US)

(72) Inventor: Ahmed Said Sallam, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,649

(22) Filed: Dec. 13, 2016

(65) Prior Publication Data

US 2017/0091452 A1 Mar. 30, 2017

Related U.S. Application Data

(63) Continuation of application No. 12/874,700, filed on Sep. 2, 2010, now Pat. No. 9,536,089.

(51) Int. Cl.
| | |
|---|---|
| *G06F 21/56* | (2013.01) |
| *G06F 9/44* | (2006.01) |
| *H04L 29/06* | (2006.01) |

(52) U.S. Cl.
CPC ............ *G06F 21/564* (2013.01); *G06F 9/442* (2013.01); *G06F 21/56* (2013.01); *G06F 21/566* (2013.01);
(Continued)

(58) Field of Classification Search
CPC ...... G06F 21/56; G06F 21/566; G06F 21/564; G06F 21/568; H04L 63/145; H04L 63/1416
See application file for complete search history.

(56) References Cited

U.S. PATENT DOCUMENTS

| | | | |
|---|---|---|---|
| 5,440,723 A | 8/1995 | Arnold et al. | 395/181 |
| 5,796,989 A | 8/1998 | Morley et al. | 703/26 |

(Continued)

FOREIGN PATENT DOCUMENTS

| | | | |
|---|---|---|---|
| GB | 2466922 | 7/2010 | H04L 29/06 |

OTHER PUBLICATIONS

Butler, Kevin RB, Stephen McLaughlin, and Patrick D. McDaniel. "Rootkit-resistant disks." Proceedings of the 15th ACM conference on Computer and communications security. ACM, 2008. (pp. 403-416).*

(Continued)

*Primary Examiner* — Kari Schmidt
(74) *Attorney, Agent, or Firm* — Baker Botts L.L.P.

(57) ABSTRACT

A method for detecting memory modifications includes allocating a contiguous block of a memory of an electronic device, and loading instructions for detecting memory modifications into the contiguous block of memory. The electronic device includes a plurality of processing entities. The method also includes disabling all but one of a plurality of processing entities of the electronic device, scanning the memory of the electronic device for modifications performed by malware, and, if a memory modification is detected, repairing the memory modification. The method also includes enabling the processing entities that were disabled. The remaining processing entity executes the instructions for detecting memory modifications.

20 Claims, 3 Drawing Sheets

(52) U.S. Cl.
CPC .......... *G06F 21/568* (2013.01); *H04L 63/145* (2013.01); *H04L 63/1416* (2013.01)

(56) References Cited

U.S. PATENT DOCUMENTS

| | | | |
|---|---|---|---|
| 5,826,013 A | 10/1998 | Nachenberg | 395/186 |
| 6,006,328 A | 12/1999 | Drake | 713/188 |
| 6,240,530 B1 | 5/2001 | Togawa | 714/38.13 |
| 6,266,754 B1* | 7/2001 | Laczko, Sr. | G06F 12/145 711/152 |
| 6,598,112 B1 | 7/2003 | Jordan et al. | 711/2 |
| 6,973,578 B1 | 12/2005 | McIchionc | 713/200 |
| 6,986,042 B2 | 1/2006 | Griffin | 713/164 |
| 7,069,589 B2 | 6/2006 | Schmall et al. | 726/24 |
| 7,137,039 B2 | 11/2006 | Durrant et al. | 714/47.2 |
| 7,363,657 B2 | 4/2008 | Caccavale | 709/229 |
| 7,530,106 B1 | 5/2009 | Zaitsev et al. | 726/24 |
| 7,725,941 B1 | 5/2010 | Pavlyushchik | 726/24 |
| 7,730,040 B2 | 6/2010 | Reasor et al. | 707/690 |
| 7,765,481 B2 | 7/2010 | Dixon et al. | 715/738 |
| 7,788,359 B2 | 8/2010 | Lund et al. | 709/223 |
| 7,836,504 B2 | 11/2010 | Ray et al. | 726/24 |
| 7,890,627 B1 | 2/2011 | Thomas | 709/224 |
| 8,001,606 B1 | 8/2011 | Spertus | 726/25 |
| 8,112,806 B1 | 2/2012 | Sobel et al. | 726/24 |
| 8,132,057 B2 | 3/2012 | Jann et al. | 714/38.1 |
| 8,225,406 B1 | 7/2012 | Nachenberg | 726/24 |
| 8,370,932 B2 | 2/2013 | Adams | 726/22 |
| 8,392,379 B2* | 3/2013 | Lee | G06F 21/564 707/687 |
| 8,499,349 B1 | 7/2013 | Cruz et al. | 726/24 |
| 8,572,371 B2 | 10/2013 | Gassoway | 713/176 |
| 8,584,240 B1 | 11/2013 | Yang | 713/188 |
| 9,098,333 B1* | 8/2015 | Obrecht | G06F 9/50 |
| 9,177,153 B1* | 11/2015 | Perrig | G06F 21/57 |
| 2002/0066024 A1 | 5/2002 | Schmall et al. | 713/200 |
| 2003/0009482 A1 | 1/2003 | Benerjee et al. | 707/200 |
| 2003/0159070 A1 | 8/2003 | Mayer et al. | 713/201 |
| 2004/0168070 A1 | 8/2004 | Szor | 713/188 |
| 2004/0187023 A1 | 9/2004 | Alagna et al. | 713/200 |
| 2004/0236874 A1 | 11/2004 | Largman et al. | 710/8 |
| 2006/0031483 A1 | 2/2006 | Lund et al. | 709/224 |
| 2006/0075468 A1 | 4/2006 | Boney et al. | 726/2 |
| 2006/0101277 A1 | 5/2006 | Meenan et al. | 713/182 |
| 2006/0130141 A1* | 6/2006 | Kramer | G06F 21/562 726/23 |
| 2006/0137012 A1 | 6/2006 | Aaron | 726/24 |
| 2006/0206713 A1 | 9/2006 | Hickman et al. | 713/176 |
| 2006/0253458 A1 | 11/2006 | Dixon et al. | 707/10 |
| 2006/0294592 A1 | 12/2006 | Polyakov et al. | 726/24 |
| 2007/0006308 A1 | 1/2007 | Desouza et al. | 726/24 |
| 2007/0130351 A1 | 6/2007 | Alperovitch et al. | 709/229 |
| 2007/0162587 A1 | 7/2007 | Lund et al. | 709/223 |
| 2007/0214151 A1 | 9/2007 | Thomas et al. | 707/10 |
| 2007/0250927 A1 | 10/2007 | Naik et al. | 726/22 |
| 2008/0016339 A1 | 1/2008 | Shukla | 713/164 |
| 2008/0082662 A1 | 4/2008 | Dandliker et al. | 709/225 |
| 2008/0091912 A1 | 4/2008 | Fleming et al. | 711/170 |
| 2008/0133540 A1 | 6/2008 | Hubbard et al. | 707/10 |
| 2008/0178288 A1 | 7/2008 | Alperovitch et al. | 726/22 |
| 2008/0183996 A1 | 7/2008 | Field et al. | 711/163 |
| 2008/0189788 A1 | 8/2008 | Bahl | 726/25 |
| 2008/0209557 A1 | 8/2008 | Herley et al. | 726/23 |
| 2008/0244744 A1 | 10/2008 | Thomas et al. | 726/23 |
| 2008/0244748 A1 | 10/2008 | Neystadt et al. | 726/24 |
| 2009/0007100 A1 | 1/2009 | Field et al. | 718/1 |
| 2009/0044276 A1 | 2/2009 | Abdel-Aziz et al. | 726/24 |
| 2009/0070878 A1 | 3/2009 | Wang et al. | 726/24 |
| 2009/0077664 A1 | 3/2009 | Hsu et al. | 726/24 |
| 2009/0083852 A1 | 3/2009 | Kuo et al. | 726/22 |
| 2009/0119681 A1 | 5/2009 | Bhogal et al. | 719/318 |
| 2009/0165137 A1 | 6/2009 | Yoo et al. | 726/24 |
| 2009/0187991 A1 | 7/2009 | Freericks et al. | 726/24 |
| 2009/0222796 A1 | 9/2009 | Keohane et al. | 717/128 |
| 2009/0282476 A1 | 11/2009 | Nachenberg et al. | 726/22 |
| 2010/0058468 A1 | 3/2010 | Green et al. | 726/22 |
| 2010/0077480 A1 | 3/2010 | Yoo | 726/24 |
| 2010/0107252 A1 | 4/2010 | Mertoguno | 726/23 |
| 2010/0162391 A1 | 6/2010 | Loveland et al. | 726/22 |
| 2010/0186088 A1 | 7/2010 | Banerjee et al. | 726/23 |
| 2010/0192222 A1 | 7/2010 | Stokes et al. | 726/22 |
| 2010/0235647 A1 | 9/2010 | Buer | 713/187 |
| 2011/0107423 A1 | 5/2011 | Kolar Sunder et al. | 726/24 |
| 2011/0185428 A1 | 7/2011 | Sallam | 726/24 |
| 2011/0209219 A1 | 8/2011 | Zeitlin et al. | 726/23 |
| 2011/0209222 A1 | 8/2011 | Sharp et al. | 726/26 |
| 2011/0265182 A1 | 10/2011 | Peinado et al. | 726/24 |

OTHER PUBLICATIONS

Pennington, Adam G., et al. "Storage-based intrusion detection." ACM Transactions on Information and System Security (TISSEC) 13.4 (2010): 30.*

Shi, Weidong, et al. "InfoShield: A security architecture for protecting information usage in memory." High-Performance Computer Architecture, 2006. The Twelfth International Symposium on. IEEE, 2006. (pp. 222-231).*

Quynh, Nguyen Anh, and Yoshiyasu Takefuji. "Towards a tamper-resistant kernel rootkit detector." Proceedings of the 2007 ACM symposium on Applied computing. ACM, 2007. (pp. 276-283).*

Secure Computing Corporation, "TrustedSource: The Next-Generation Reputation System for Enterprise Gateway Security", pp. 1-17, 2007.

Unites States Office Action; U.S. Appl. No. 12/694,960; pp. 11, Mar. 5, 2012.

United States Office Action; U.S. Appl. No. 12/695,005; pp. 22, Apr. 19, 2012.

Notice of Allowance received for U.S. Appl. No. 12/694,988, 7 pages, Apr. 25, 2014.

Non-Final Office Action issued in U.S. Appl. No. 12/694,988, 9 pages, Jul. 5, 2013.

Final Office Action issued in U.S. Appl. No. 12/694,988, 7 pages, Sep. 26, 2012.

Final Office Action issued in U.S. Appl. No. 12/694,988, 11 pages, Oct. 18, 2013.

Non-Final Office action issued in U.S. Appl. No. 12/694,960; 18 pages, Jun. 26, 2015.

Final Office Action issued in U.S. Appl. No. 12/694,960; 26 pages, Dec. 21, 2015.

Non-Final Office Action issued in U.S. Appl. No. 14/467,668; 20 pages, Feb. 2, 2016.

U.S. Appl. No. 12/694,960; pp. 36, filed Jan. 27, 2010.

Unites States Office Action; U.S. Appl. No. 12/694,960; pp. 19, Mar. 5, 2012.

U.S. Appl. No. 12/694,988; pp. 38, filed Jan. 27, 2010.

Unites States Office Action; U.S. Appl. No. 12/694,988; pp. 25, Apr. 18, 2012.

U.S. Appl. No. 12/840,032; pp. 42, filed Jul. 20, 2010.

Unites States Office Action; U.S. Appl. No. 12/840,032; pp. 21, Jul. 6, 2012.

U.S. Appl. No. 12/695,005; pp. 56, filed Jan. 27, 2010.

Unites States Office Action; U.S. Appl. No. 12/695,005; pp. 37, Apr. 19, 2012.

U.S. Appl. No. 12/695,011; pp. 42, filed Jan. 27, 2010.

Unites States Office Action; U.S. Appl. No. 12/695,011; pp. 25, filed Mar. 7, 2012.

Azab, Ahmed M. et al. "HIMA: A hypervisor-based integrity measurement agent." Computer Security Applications Conference, 2009. ACSAC'09. Annals IEEE, 2009 pp. 461-470, 2009.

Doudalis, Ioannis, and Milos Prvulovic, "HARE: Hardware assisted reverse execution" HPCA-16 2010 The Sixteenth International Symposium on High-Performance Computer Architecture. IEEE 2010 pp. 1-12, 2010.

Mazahid, Abdullah, Norimasa Otsuki, and Josep Torrellas, "Atomtracker: A comprehensive approach to atomic region inference and violation detection", Proceedings of the 2010 43rd Annual (56) References Cited

OTHER PUBLICATIONS

IEEE/ACM International Symposium on Microarchitecture. IEEE Computer Society, 2010 pp. 287-297, 2010.

* cited by examiner

ATOMIC DETECTION AND REPAIR OF KERNEL MEMORY

RELATED APPLICATIONS

This application is a continuation of U.S. patent application Ser. No. 12/874,700 filed Sep. 2, 2010, the contents of which is incorporated by reference herein.

TECHNICAL FIELD

The present invention is related to relates generally to computer security and malware protection and, more particularly, to a method for atomic detection and repair of kernel memory.

BACKGROUND

Computer malware operating in a multi-core or multi-processor environment may be difficult to detect and remove. In addition, such malware may make malicious modifications to kernel memory of a computer system. Such malware may thus be running at a very low level of a system.

Atomic operation of instructions on a processor or core may mean the ability of those instructions to run without being interrupted by the system. The ability of a process, thread, or other set of instructions to run atomically on a system may be handled by establishing a hierarchy of such instructions. The ability of one instruction to be executed over another may be resolved by determining which instruction was first received, or which one is the shorter or lower-level instruction.

Malware may include, but is not limited to, spyware, rootkits, password stealers, spam, sources of phishing attacks, sources of denial-of-service-attacks, viruses, loggers, Trojans, adware, or any other digital content that produces malicious activity.

SUMMARY

A method for detecting memory modifications includes allocating a contiguous block of a memory of an electronic device, and loading instructions for detecting memory modifications into the contiguous block of memory. The electronic device includes a plurality of processing entities. The method also includes disabling all but one of a plurality of processing entities of the electronic device, scanning the memory of the electronic device for modifications performed by malware, and, if a memory modification is detected, repairing the memory modification. The method also includes enabling the processing entities that were disabled. The remaining processing entity executes the instructions for detecting memory modifications.

In a further embodiment, an article of manufacture includes a computer readable medium and computer-executable instructions. The computer-executable instructions are carried on the computer readable medium. The instructions are readable by a processor. The instructions, when read and executed, cause the processor to allocate a contiguous block of a memory of an electronic device, load instructions for detecting memory modifications into the contiguous block of memory, disable all but one processing entity of the electronic device, scan the memory of an electronic device for modifications performed by malware, repair a detected memory modification, and enable the processing entities that were disabled. The electronic device includes a plurality of processing entities. The remaining processing entity executes the instructions for detecting memory modifications.

BRIEF DESCRIPTION

For a more complete understanding of the present invention, and the advantages thereof, reference is now made to the following written description taken in conjunction with the accompanying drawings, in which.

DETAILED DESCRIPTION OF THE INVENTION

Figure 1:
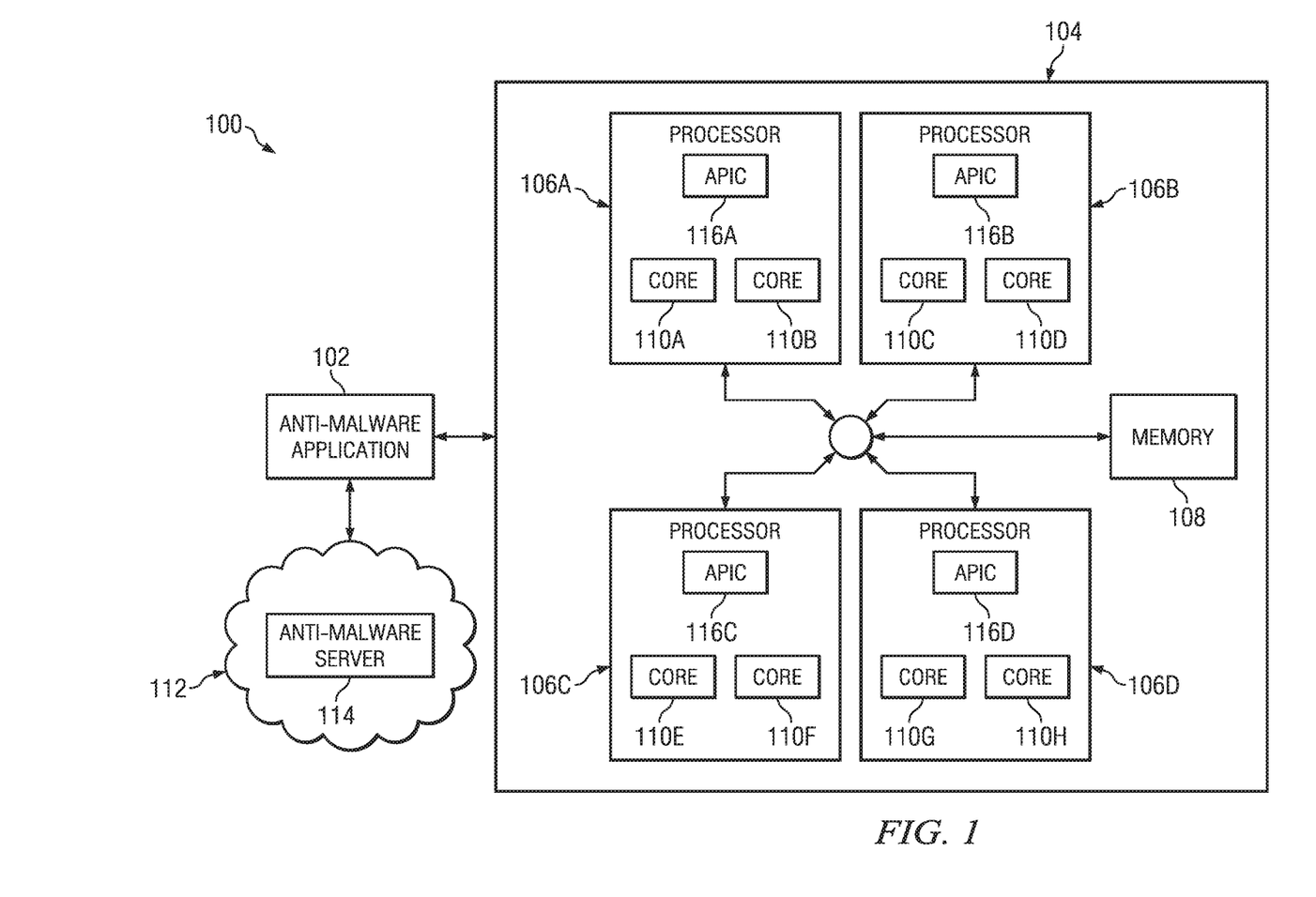
FIG. 1 is an example embodiment of a system for atomic detection and repair of kernel memory based malware in a multi-core processor environment.

FIG. 1 is an example embodiment of a system 100 for atomic detection and repair of kernel memory based malware in a multi-core processor environment. System 100 may comprise an anti-malware application 102 configured to scan electronic device 104 for malware. Anti-malware application 102 may be configured to operate on electronic device 104. Anti-malware application 102 may be communicatively coupled to electronic device 104 over a network. Anti-malware application 102 may be configured to run on a network such as a cloud computing network. Anti-malware application 102 may be communicatively coupled to an anti-malware server 114 over a network such as network 112. Anti-malware application 102 may be configured to determine the presence of kernel-memory-related malware on electronic device 104. Electronic device 104 may include multiple processing entities. In one embodiment, such processing entities may include processors or processing cores. Electronic device 104 may include a multicore processor environment.

Electronic device 104 may include one or more processors 106 coupled to a memory 108. Processors 106 may each include one or more cores 110. One or more processors 106 may each be coupled to other processors 106. For example, processor 106A may include core 110A and core 110B. Processor 106A may be coupled to processor 106B, 106C and 106D. In one embodiment, each processor 106 may include an even number of cores. In various embodiments, processor 106 may include two cores, four cores or eight cores. Each processor 106 may include an interrupt controller. In one embodiment, processors 106 may each include an advanced programmable interrupt controller ("APIC"). APIC 116 may be configured to combine interrupts into one or more communication mechanisms per processor 106. APIC 116 may be configured to assign priority to one or more interrupts received by processor 106.

Anti-malware application 102 may be configured to receive detection information from anti-malware server 112. Such detection information, may include, but is not limited to, antivirus signatures, behavioral rules, reputation analysis or any other suitable mechanism for detecting the presence of malware on electronic devices such as electronic device 104. Anti-malware application 102 may be configured to apply detection information for the detection of malware on electronic device 104 at any suitable time. For example, anti-malware application 102 may be configured to scan electronic device 104 upon demand by a user or administrator of electronic device 104 for malware, or at a regularly scheduled or periodic time. In yet another embodiment, anti-malware application 102 may be configured to scan electronic device 104 for malware upon the detection of suspicious behavior or evidence indicating that electronic device 104 may be infected with malware.

Network 112, or any other networks used in system 100, may include any suitable networks for communication between electronic device 104, anti-malware application 102, and anti-malware server 114. Such networks may include but are not limited to: the Internet, an intranet, wide-area-networks, local-area-networks, back-haul-networks, peer-to-peer-networks, or any combination thereof.

Each of processors 106 may be implemented, for example, by a microprocessor, microcontroller, digital signal processor (DSP), application specific integrated circuit (ASIC), or any other digital or analog circuitry configured to interpret and/or execute program instructions and/or process data. In some embodiments, each of processors 106 may interpret and/or execute program instructions and/or process data stored in memory 108. Memory 108 may be configured in part or whole as application memory, system memory, or both. Memory 108 may include any system, device, or apparatus configured to hold and/or house one or more memory modules. Each memory module may include any system, device or apparatus configured to retain program instructions and/or data for a period of time (e.g., computer-readable media).

Figure 2:
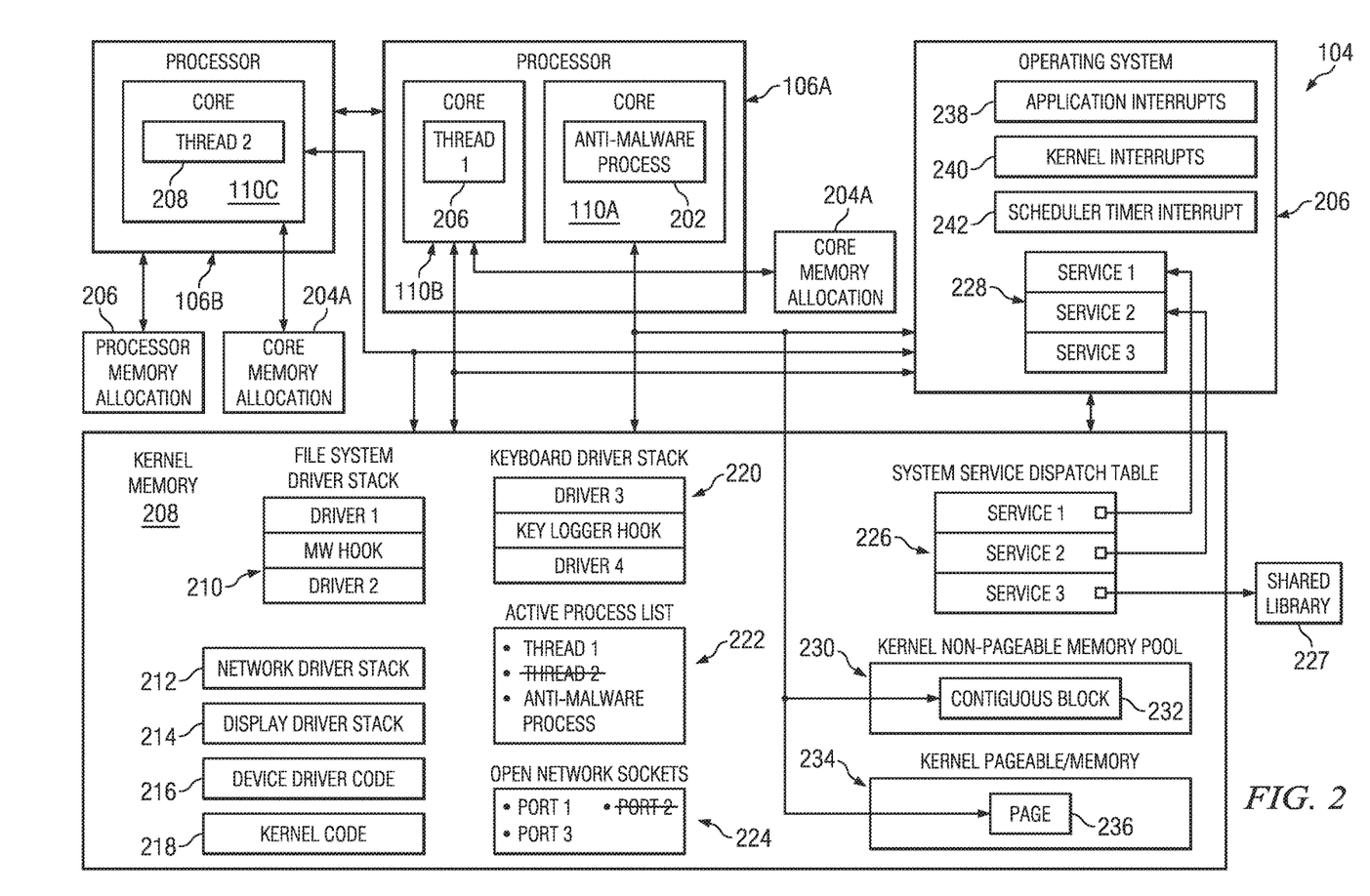
FIG. 2 is a further illustration of the components of an electronic device in a system for atomic detection and repair of kernel memory.

FIG. 2 is a further illustration of the components of electronic device 104 in a system for atomic detection and repair of kernel memory. Electronic device 104 may include, for example, one or more processors 106A and 106B, operating system 206, kernel memory 208, and various memory allocations such as processor memory allocation 204 and core memory allocation 206. Each processor 106 may contain one or more cores 110. Each core 110 may be assigned a memory allocation, such as core memory allocation 204. Each processor 106 may be assigned a processor memory allocation 206. Each processor 106 may be coupled to other processors. Each core 110 may be configured to access operating system 206 or various sections of memory such as kernel memory 208. Each core 110 on a processor 106 may be configured to have one or more threads running in such a core. For example, core 110B of processor 106A may be executing Thread_1 206. In another example, processor 106B may contain core 110c which may be executing Thread_2 208.

Operating system 206 may be configured to provide system services to electronic device 104. Operating system 206 may be implemented in any suitable software for providing operating system services to an electronic device. Operating system 206 may be coupled to kernel memory 208.

Anti-malware application 102 may be configured to scan electronic device 104 for the presence of malware by the execution of anti-malware process 202. Anti-malware process 202 may execute in any of the cores 110 of any of the processors 106 on electronic device 104. Anti-malware process 202 may be configured to execute on the primary core of electronic device 104. Anti-malware process 202 may execute as a standalone process separate from anti-malware application 102. In one embodiment, anti-malware application 102 may be configured to launch the execution of anti-malware process 202. In such an embodiment, anti-malware application 102 may be configured to cease execution while anti-malware process 202 continues execution and scanning of malware on electronic device 104. Anti-malware process may be configured to scan kernel memory 208 for evidence of kernel mode memory malware. Anti-malware process 202 may be configured to use various parts of operating system 206 in order to scan kernel memory 208 for malware.

Anti-malware process 202 may be configured to scan any suitable portion of kernel memory 208 which may be infected with malware, or affected by such an infection. For example, anti-malware process 202 may be configured to scan a file system driver stack 210, network driver stack 212, display driver stack 214, device driver code 216, kernel code 218, keyboard driver stack 220, active process list 222, open network sockets 224, or system service dispatch table 226 for indications of malware. Malware, or indicators of malware, may be present in various portions of kernel memory 208. Anti-malware process 202 may be configured to detect and undo the effects of malware in kernel memory 208 of malware operating in cores such as 110A, 110B and 110c.

Other anti-malware software may be limited to detecting the operation of malware processes only in the same core in which the other anti-malware software is currently operating. However, in the example of FIG. 2, while anti-malware process 202 is operating in core 110A, anti-malware process 202 may be configured to detect the effects of malware of threads operating in other cores, such as Thread_1 206 in core 110B, or Thread_2 208 in core 110c. If malware, operating as part of Thread_1 206 or Thread_2 208, detect the presence or scanning and repairing operation of anti-malware process 202, such malware may tamper with, obstruct, remove, or otherwise counteract anti-malware process 202 or the changes enacted by anti-malware process 202. One way that such malware may hamper anti-malware process 202 is by configuring Thread_1 206 or Thread_2 208 to have a higher priority or an equal priority to anti-malware process 202. For example, Thread_1 206 and Thread_2 208 may be operating in a ring zero of the operation of electronic device 104. As such, the operation of Thread_1 206 and Thread_2 208 may be described as "atomic."

Anti-malware process 202 may be configured to subvert the execution of threads on cores other than the core on which anti-malware process 202 is running in order that anti-malware process 202 may execute atomically, or without risk of interruption by threads operating in other cores or processors. In one embodiment, anti-malware process 202 may be configured to stop the execution of threads on other cores such as Thread_1 206 and Thread_2 208, whether such cores are located on the same processor 106 as anti-malware process 202 or not. In a further embodiment, anti-malware process 202 may be configured to cease the operation of the cores other than core 110A, the core upon which anti-malware process 202's is operating.

Anti-malware process 202 may be configured to allocate a contiguous block of memory in kernel memory 208. In one embodiment, such a contiguous block of memory may be implemented in kernel non-pageable memory pool 230. Kernel non-pageable memory pool 230 may include a contiguous block 232 of memory.

Anti-malware process 202 may be configured to operate inside of kernel non-pageable memory pool 230. In one embodiment, anti-malware process 202 may be configured to operate inside a contiguous block 232. Anti-malware application 102 may be configured to set up the execution of anti-malware process 202 inside of kernel non-pageable memory pool 230. Contiguous block 232 may thus include malware detection and repair logic malware detection and repair logic for scanning kernel memory 208 for malware and for repairing the effects of malware found in kernel memory 208. Anti-malware process 202 may be configured to turn off all processors in electronic device 104, except for the processor upon which anti-malware process 202 is running. For example, anti-malware process 202 may be configured to turn off execution of processor 106B, leaving processor 106A executing. Anti-malware process 202 may be configured to run on the base system processor. Anti-malware process 202 may be configured to disable interrupts of operating system 206. Such interrupts may include application interrupts 238, kernel interrupts 240 and scheduler timer interrupt 242. Application interrupts 238 may include interrupts that may originate from applications of electronic device 104. Kernel interrupts 240 may include interrupts that originate from portions of electronic device 104 having kernel level access. Scheduler timer interrupt 242 may comprise an interrupt for scheduling execution of threads in a given processor or core. Interrupts such as application interrupts 238, kernel interrupts 240 and scheduler timer interrupt 242 may be implemented fully or in part by APIC 116. Configuring anti-malware process 202 to shut down scheduler timer interrupt 242 may cause all running processes on electronic device 104 to cease operation except anti-malware process 202.

Anti-malware process 202 may be configured, when scanning electronic device 104 for memory modifications, to be the only process or thread running on any core 110 or processor 106 of electronic device 104. Anti-malware process 202 may be configured to then scan kernel memory 208 for modifications made by malware and subsequently repair kernel memory 208 of any such modifications or other effects of malware. Anti-malware process 202 may be configured to scan kernel memory 208 for any suitable memory modification performed by malware. Anti-malware process 202 may be configured to scan any suitable portion of kernel memory 208 for malicious modifications made by malware.

For example, file system driver stack 210 may be modified to include a malware hook among the different drivers in the stack. Keyboard driver stack 220 may have a key logger hook embedded among one or more other drivers. Active process list 222 may have been modified to eliminate the presence of, for example, Thread_2, in active process list 222, or may have been modified in such a way to disguise the presence of Thread_2 in active process list 222. Open network sockets 224 may have been modified to eliminate information showing that Port_2 is or has been accessed. Code sections of the kernel in kernel code 218 may have been modified by malware, as may have the code of a device driver in device driver code 216. System service dispatch table 226 may have been modified so as to change a service executable module or other digital entity which is pointed to by entries in system service dispatch table 226. For example, Service 2 in entry in system service dispatch table 226 may have originally pointed to a particular service 228 posted by operating system 206. Instead, malware may have modified system service dispatch table 226 entry for Service 2 to point instead to a shared library 227. Such a redirection may comprise a malware infection. Modifications to kernel data structures such as active process list 222, open network sockets list 224, and other data structures may have been made to hide evidence of malware. Changes to various stacks, such as driver stack 210, keyboard driver stack 220, network driver stack 212 and display driver stack 214 may have been made by inserting malicious code in a layer of the driver stack to disguise the presence of malware. To detect memory modifications in such elements, anti-malware process 202 may be configured to examine different portions of kernel memory 208 and compare them against, for example, known safe values or known signatures corresponding to malware.

Because scheduler timer interrupts 242 may have been disabled by anti-malware process 202, anti-malware process 202 might not be configured to access various features, capabilities or services of operating system 206 while scanning electronic device 104 for malicious memory modifications. For example, anti-malware process 202 might not be able to access various portions of system memory unless the memory is pinned and locked. In another example, anti-malware process 202 may not be configured to access an operating system function unless the function operates independently of creating or referencing a kernel dispatchable object.

Anti-malware process 202 may be configured to repeatedly enable and disable some or all of operating system 206, as needed to access various portions of operating system 206 while scanning electronic device 104 for malicious memory modifications. Anti-malware process 202 may be configured to temporarily enable one or more services available of operating system 206. Anti-malware process 202 may be configured to verify the infection status of a given process or service, or of memory associated with such a given process or service, as not infected by malware before using such a process or service.

In one embodiment, the teachings of the present disclosure may be applied to configure anti-malware process 202 to detect the infection of malware in user mode memory. An example of such user mode memory may be core memory allocations 204. Possibly malicious threads may be running in such a core memory allocation 204 and may work to subvert the operation of an anti-malware process such as anti-malware process 202, as anti-malware process 202 attempts to detect and repair memory modifications or process infections in user mode memory. Anti-malware process 202 may be configured to lock a process of a core into a particular segment of core memory allocation 204, and subsequently scanning and repairing the processed memory into which the thread or process has been locked.

In operation, one or more processors 106 may be executing one or more threads in one or more cores 110 on electronic device 104. One or more threads operating on electronic device 104 may be a portion of a malicious program such as malware. In one embodiment, a single processor 106 on electronic device 104 may be executing two or more cores 110. In another embodiment, two or more processors 106 may be executing on electronic device 104. In such an embodiment, each processor 106 may have a single core or more than one core 110. Each core of electronic device 104 may be executing one or more threads. Anti-malware application 102 may receive detection information from anti-malware server 114 over network 112. Anti-malware application 102 may receive detection information such as logic to determine whether modifications have been made to memory 108 of electronic device 104 that are malicious and possibly created by malware.

Anti-malware application 102 may be executing on a cloud computing scheme. In another embodiment, anti-malware application 102 may be executing on electronic device 104. Anti-malware application 102 or anti-malware process 202 may reserve a contiguous block 232 of memory inside of kernel memory 208. In one embodiment, such a reservation may be made in kernel non-pageable memory pool 230. Anti-malware process 202 may begin executing in contiguous block 232.

Anti-malware process 202 may contain malware detection and repair logic sufficient to scan kernel memory 208 for memory modifications made by malware, and repairing such modifications. Anti-malware application 104 may initiate operation of anti-malware process 202.

Anti-malware process 202 may turn off all processors 106 in electronic device 104 except for the processor 106A upon which anti-malware process 202 is executing. Anti-malware process 202 may switch off the execution of all cores 110 which may be executing on electronic device 104 except for the core 110A upon which anti-malware process 202 may be executing. Anti-malware process 202 may disable all interrupts of an operating system 206 of electronic device 104. Such interrupts may include application interrupt 238 including user mode interrupts, kernel interrupts 240 including kernel mode interrupts, and any scheduler timer interrupts 242.

Anti-malware process 202 may use any suitable method for disabling the operation of processors 106, cores 110 and interrupts 238, 240, 242. In one embodiment, anti-malware process 202 may directly program electronic device 104 and processors 106 to disable the operation of processors 106 and core 110. In such an embodiment, anti-malware process 202 may access a programmable interrupt controller of a given processor 106B. Such a programmable interrupt controller may include advanced programmable interrupt controller (APIC) 116. The commands or methods used to program advanced programmable interrupt controller 116 may depend upon the specific processor 106 chosen to implement system 100. Anti-malware process 202 may directly program processor 106B to disable interrupts and processing by programming APIC 116 using inert processor interrupts.

In another embodiment, anti-malware process 202 may use a service provided by operating system 206 to disable operation of processor 106B or of operating system 206. In such an embodiment, the commands used to disable operation of processor 106B and operating system 206 may be specific to the operating system 206 running on electronic device 104. In such an embodiment, a kernel debugging facility of operating system 206 may be used. Such a built in kernel debugger may have services available to freeze and resume execution of operating system 206. For example, in the kernel mode of the Windows operating system, two instructions may be suitable for use by anti-malware process 202 to disable the operation of processor 106 and operating system 206. Two such functions are KeFreezeExecution and KeThawExecution. Anti-malware application 102 or anti-malware process 202 may be configured to access such functions by computing their address and calling their functions directly in memory 108. In such an example, KeFreezeExecution, or an equivalent function, may perform the following steps: (a) disabling interrupts of operating system 206; (b) calling an interprocessor interrupt service to notify the service that execution will be frozen; (c) calling into the hardware abstraction layer (HAL) exported function called KeStallExecutionProcessor, to stall processor execution of all processors except the current processor; and (d) notify other processors, such as 106B, that execution is to be frozen, by sending interprocessor interrupts via the calling the HAL function HalRequestIpi. Anti-malware process 202 may call the freeze function to freeze execution of processors 106 and call the thaw function to unfreeze execution of processors 106.

After putting processors 106 or cores 208 in suspended operation, anti-malware process 202 may examine kernel memory 208 for possible malicious memory modifications. For example, anti-malware process 202 may examine file system driver stack 210 to determine whether or not malware has been inserted inside of the driver stack, in the form of a hook. Anti-malware process 202 may similarly examine network driver stack 212 or display driver stack 214. Anti-malware process 202 may examine keyboard driver stack 220 to determine, for example, whether a key logger hook has been inserted inside of the stack. Such hooks may be used to mine information from memory or to disguise the presence of other malicious pieces of code. Anti-malware process 202 may examine active process list 222 to determine whether any modifications have been made to hide the execution of a malware process. For example, if Thread_2 208 operating in core 110c on processor 106B comprises malware, active process list 222 may have been modified to hide the presence of Thread_2 208 as an active thread. Anti-malware process 202 may examine open network sockets 224 to determine whether modifications have been made to disguise the network access of an application. Such modifications may be used to hide the network access of malware. For example, if Port_2 were being used by Thread_2 208, a malicious process, open network source sockets 224 may be modified to hide the access of Port_2. Anti-malware process 202 may examine system service dispatch table 226 to determine whether service dispatches have been modified to redirect execution to other services, modules, strips or libraries. For example, Service_3 may be redirected by malware to point to shared library 227 instead of Service_3 of operating system 206. Such a redirection may be an attempt to run malicious code instead of a trusted service.

Once anti-malware process 202 has determined a portion of kernel memory 208 has been infected with a memory modification by malware, anti-malware process 202 may take steps to correct the memory modification of kernel memory 208. To correct memory modifications, anti-malware process 202 may re-enable portions of operating system 206, access parts of electronic device 104 needed to repair memory modifications by malware, and then again disable operating system 206 and processors 106. Anti-malware process 202 may clean or verify system components before activating them for the purposes of cleaning other portions of electronic device 104. For example, if anti-malware process 202 determines that system service dispatch table 226 has been modified by malware, anti-malware process 202 may re-enable portions of operating system 206 to access the original code bytes of the modified image on disk of the system service dispatch table 226. Anti-malware process 202 may then copy the original code bytes of the modified image and copy them into non-pageable kernel memory 230. Anti-malware process 202 may then again disable operating system 206 and any processors 106 that have been activated. Anti-malware process 202 may then examine the correct values for the code bytes for the image of system service dispatch table 226, and repair system service dispatch table 226 in safety without fear of modifications by other malicious malware running in other threads such as Thread_2 208. For malware memory modifications in portions of kernel memory 208, such as code sections in device driver code 216 or kernel code 218, that cannot be reloaded, anti-malware process 202 may fill the pages of the memory infection with NOP instructions or place a return or a jump to avoid execution of the malicious code. Anti-malware process 202 may make similar activations and deactivations of portions of operating system 206 or processors 106 in order to systematically scan kernel memory 208 for infections, make repairs, and reactivate portions of operating system 206 and processors 106, as various portions of operating system 206, kernel memory 208 and processors 106 are deemed safe and clean by anti-malware process 202.

In one embodiment, anti-malware process 202 may be applied to memory that is non-pageable. In such an embodiment, anti-malware process 202, before freezing execution, may lock memory pages of memory 108 needed to scan.

In one embodiment, anti-malware process 202 may scan application memory, such as memory allocation 206 or core memory allocation 204. In such an embodiment, anti-malware process 202 may force an attachment into the target process address space. In the Windows operating system environment, one method for accomplishing such a task is to call the function KeStackAttachProcess. The target applications whose application memory is to be scanned may be locked. Anti-malware process 202 may alternate between switching to different process contexts, freezing and resuming the execution in between scanning and repairing process memories associated with cores 110 or processor 106.

Figure 3:
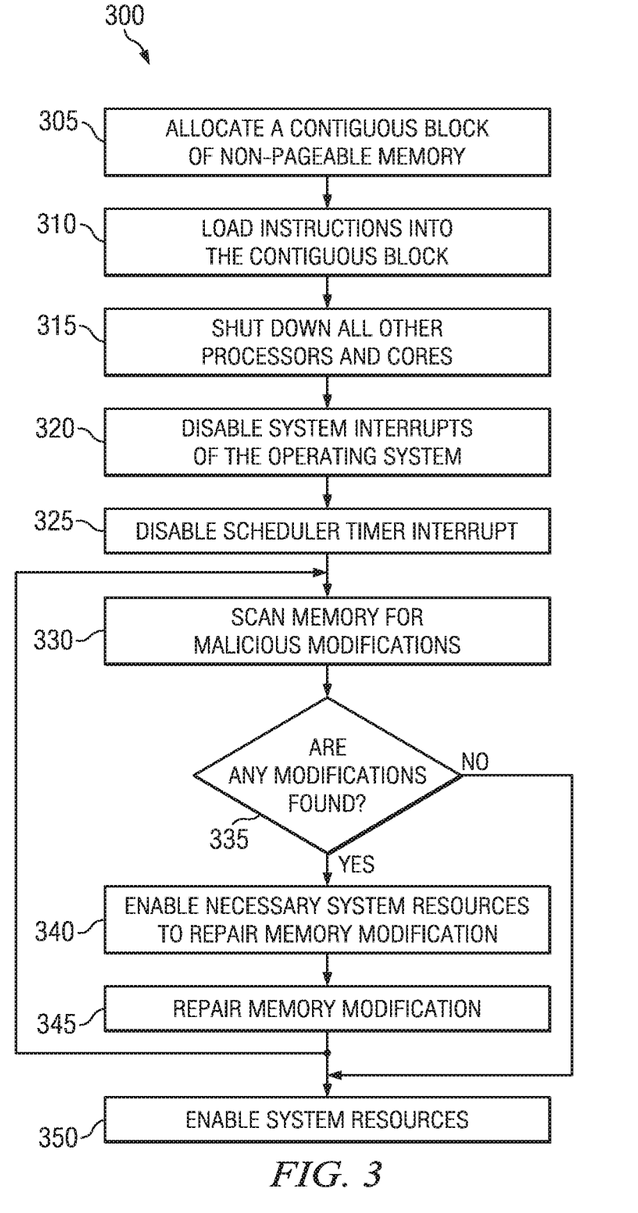
FIG. 3 is an example embodiment of a method for atomic detection and repair of kernel memory-based malware in a multi-core processor environment.

FIG. 3 is an example embodiment of a method 300 for atomic detection and repair of kernel memory-based malware in a multi-core processor environment. In Step 305, a contiguous block of non-pageable memory may be allocated. The contiguous block of kernel memory may be configured for an anti-malware process to operate and scan the kernel memory of an electronic device for memory modifications conducted by malware. In Step 310, detection and repair instructions may be loaded into the contiguous block. Such detection and repair instructions may make up an anti-malware application or a portion of an anti-malware application.

In Step 315, all processors and cores, except for the core and processor upon which the detection and repair instructions are loaded, may be shut down. The anti-malware application may change its thread affinity to make it run on the base system processor or the primary core. In one embodiment, Step 315 may be implemented by directly programming the system or a local processor programmable interrupt controller. In another embodiment, Step 315 may be implemented by an operating system service provided for the shutting down of processors or cores. Such a service may consist of a kernel debugging facility. In a system using a Windows operating system, for example, the kernel mode of the operating system may provide an undocumented instruction called KeFreezeExecution that may freeze execution of a processor or of the operating system. Likewise, another undocumented function, KeThawExecution may be provided to reverse the effects of KeFreezeExecution.

In Step 320, system interrupts of the operating system of the electronic device may be disabled. In one embodiment, the system and any processors may be directly programmed using inert processor interrupts. In Step 325, a scheduler timer interrupt may be disabled. The scheduler timer interrupt disablement may suspend new operations being scheduled by an operating system of the electronic device. In Step 330, kernel memory may be scanned for malicious modifications conducted by malware. Any suitable part of kernel memory of the electronic device may be scanned for such memory modifications. Such modifications may be in a driver, driver stack, kernel data structures, code sections, or a system service dispatch table. Any suitable method for scanning for memory modifications may be used.

In Step 335, if modifications are not found, then in Step 350, the processors, cores and interrupts of the electronic device may be reactivated. If modifications are found in Step 335, then processors, cores and interrupts necessary to allow sufficient system access for a repair of the memory modification may be optionally enabled in Step 340. Whether such resources will be enabled may depend upon the specific type of memory modification and necessary course of repair required, as well as whether such resources may be trusted to be free of malware. In Step 345, the memory modifications may be reversed, repaired, or otherwise neutralized or corrected. After modifications have been repaired, any processors, cores or interrupts that have been re-enabled may then be disabled. Optionally, Step 330 may be repeated as other portions of kernel memory are scanned for malicious memory modifications until the system has been determined to be cleaned of memory modifications.

Method 300 may be implemented using the system of FIGS. 1-2, or any other system operable to implement method 300. As such, the preferred initialization point for method 300 and the order of the steps comprising method 300 may depend on the implementation chosen. In some embodiments, some steps may be optionally omitted, repeated, or combined. In some embodiments, portions of method 300 may be combined. In certain embodiments, method 300 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present invention and its advantages have been described in detail, it should be understood that various changes, substitutions and alternations can be made herein without departing from the spirit and scope of the invention as defined by the following claims.

What is claimed is:

1. A method for detecting memory modifications, comprising:
    allocating a contiguous block of a memory of an electronic device, the electronic device comprising a plurality of processing cores;
    loading instructions for detecting memory modifications into the contiguous block of memory;
    disabling the operation of an operating system of the electronic device by disabling one or more of system interrupts, user interrupts, or scheduler timer interrupts;
    disabling all but one of the plurality of processing cores of the electronic device, the remaining processing core executing the instructions for detecting memory modifications;
    scanning the memory of the electronic device for modifications performed by malware, after disabling all but one of the plurality of processing cores and disabling one or more of system interrupts, user interrupts, or scheduler timer interrupts;
    enabling the one or more of the system interrupts, user interrupts, or scheduler timer interrupts that were disabled, after scanning the memory of the electronic device for modifications; and enabling the processing cores that were disabled, after scanning the memory of the electronic device for modifications.

2. The method of claim 1, wherein:

loading instructions for detecting memory modifications into the contiguous block of memory comprises loading the entirety of the instructions within the contiguous block; and disabling all but one of the plurality of processing cores of the electronic device, the remaining processing core executing the instructions for detecting memory modifications comprises executing the instructions as resident within the contiguous block.

3. The method of claim 1, further comprising repairing a memory modification detected during scanning the memory of the electronic device for modifications performed by malware, before enabling the one or more system interrupts, user interrupts, or scheduler timer interrupts that were disabled.

4. The method of claim 1, wherein the memory modifications comprise modifications to kernel memory.

5. The method of claim 1, wherein the memory modifications comprise modifications to application memory.

6. The method of claim 1, wherein the contiguous block of memory is allocated in non-pageable memory.

7. The method of claim 1, further comprising, before disabling all but one of the plurality of processing cores of the electronic device, modifying an affinity associated with the loaded instructions to one of the plurality of processing cores of the electronic device, wherein the processing core is the remaining processing core for executing the instructions for detecting memory modifications.

8. The method of claim 1, further comprising:

subsequent to disabling the operating system, enabling the operating system to access a system function, the system function used for repair or diagnosis of memory; and subsequently disabling the operating system after utilizing the system function.

9. The method of claim 1, wherein the processing cores of the electronic device are shut down using an operating system service.

10. The method of claim 1, further comprising:

detecting a memory modification during scanning of the memory of the electronic device;

enabling a system resource, wherein the system resource is the one or more disabled processing cores, or the one or more disabled system interrupts, user interrupts, or scheduler timer interrupts;

in response to detecting a memory modification, repairing the memory modification; and disabling the system resource after repairing the memory modification.

11. An article of manufacture, comprising:

a non-transitory computer readable medium; and computer-executable instructions carried on the non-transitory computer readable medium, the instructions readable by a processor, the instructions, when read and executed, for causing the processor to:

allocate a contiguous block of a memory of an electronic device, the electronic device comprising a plurality of processing cores;

load instructions for detecting memory modifications into the contiguous block of memory;

disable the operation of an operating system of the electronic device by disabling one or more of system interrupts, user interrupts, or scheduler timer interrupts;

disable all but one processing cores of the electronic device, the remaining processing core for executing the instructions for detecting memory modifications;

scan the memory of an electronic device for modifications performed by malware, after all but one of the plurality of processing cores is disabled and one or more of system interrupts, user interrupts, or scheduler timer interrupts is disabled;

enable the one or more of system interrupts, user interrupts, or scheduler timer interrupts that were disabled, after the scan of the memory of the electronic device for modifications; and enable the processing cores that were disabled, after the scan of the memory of the electronic device for modifications.

12. The article of claim 11, wherein:

the entirety of the instructions for detecting memory modifications are loaded within the contiguous block; and the instructions for detecting memory modifications that are executed by the remaining processing core are resident within the contiguous block.

13. The article of claim 11, wherein the processing is further caused to repair a memory modification detected during the scan of the memory of the electronic device for modifications performed by malware, before the one or more disabled system interrupts, user interrupts, or scheduler timer interrupts is enabled.

14. The article of claim 11, wherein the memory modifications comprise modifications to kernel memory.

15. The article of claim 11, wherein the memory modifications comprise modifications to application memory.

16. The article of claim 11, wherein the contiguous block of memory is allocated in non-pageable memory.

17. The article of claim 11, wherein the processing is further caused to, before all but one of the plurality of processing cores of the electronic device are disabled, modify an affinity associated with the loaded instructions to one of the plurality of processing cores of the electronic device, wherein the processing core is the remaining processing core for executing the instructions for detecting memory modifications.

18. The article of claim 11, wherein the processing is further caused to:

subsequent to disabling the operating system, enable the operating system to access a system function, the system function used for repair or diagnosis of memory; and subsequently disable the operating system after utilizing the system function.

19. The article of claim 11, wherein the processing cores of the electronic device are caused to be shut down using an operating system service.

20. The article of claim 11, wherein the processing is further caused to:

detect a memory modification during the scan of the memory of the electronic device;

enable a system resource, wherein the system resource is the one or more disabled processing cores, or the one or more disabled system interrupts, user interrupts, or scheduler timer interrupts;

in response to detection of a memory modification, repair the memory modification; and disable the system resource after the memory modification is repaired.

\* \* \* \* \*